Nov. 17, 1959 R. E. ROGERS 2,913,292
PISTON AND CONNECTING ROD ASSEMBLY
Filed Aug. 28, 1958

INVENTOR.
ROBERT E. ROGERS
BY
HIS ATTORNEY

United States Patent Office

2,913,292
Patented Nov. 17, 1959

2,913,292

PISTON AND CONNECTING ROD ASSEMBLY

Robert Eugene Rogers, Tyler, Tex., assignor to General Electric Company, a corporation of New York Application August 28, 1958, Serial No. 757,837

2 Claims. (Cl. 309—19)

The present invention relates to a piston and connecting rod assembly and is particularly concerned with such an assembly for use in compressors and the like.

It is an object of the present invention to provide a piston and connecting rod assembly including a wrist or piston pin for connecting the piston and connecting rod and improved means for retaining the wrist pin within the assembly.

A further object of the invention is to provide an assembly comprising a piston, a connecting rod, a wrist pin for pivotally connecting the piston and connecting rod, and an improved shim arrangement between the piston and connecting rod adapted to act both as a thrust bearing and as means for anchoring the wrist pin within the piston.

Further objects of the invention will become apparent as the following description proceeds and the features of novelty which characterize the invention will be pointed out with particularity in the claims annexed to and forming part of this specification.

In accordance with the present invention there is provided a piston and connecting rod assembly comprising a piston having a longitudinal recess therein and a connecting rod having one end extending into the recess. A wrist pin or piston pin extends through a transverse passage in the piston which intersects the recess and through an opening in the end of the connecting rod for holding the piston and connecting rod in operative relation. The passage in the piston and the opening in the connecting rod form bearing surfaces for the wrist pin while shims provided between the sides of the connecting rod and the adjacent walls of the piston recess function as thrust bearings. In accordance with the present invention at least one of the shims is employed to anchor the wrist pin within the piston passage and thereby prevent the ends of the wrist pin from coming in contact with and scoring the cylinder in which the piston reciprocates. For this purpose, at least one of the shims is composed of spring steel and is in the form of a split ring which can be expanded and passed over one end of the wrist pin during the assembly of the piston and connecting rod. An annular or circumferential groove on the outer surface of the wrist pin is provided for receiving the inner edge of the split shim so that with the inner edge of the shim extending into the groove and the outer edge extending between one wall of the recess and a connecting rod side wall, axial displacement of the wrist pin within the assembly is prevented and the ends of the wrist pin are maintained out of contact with the walls of a cooperating cylinder.

For a better understanding of this invention reference may be had to the accompanying drawing in which.

Figure 1:
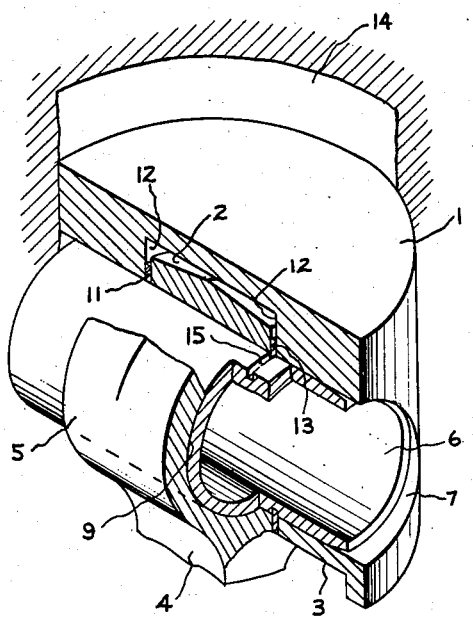
Fig. 1 is a perspective view partially in section of a piston and connecting rod assembly.

Referring to Fig. 1 of the drawing, there is shown, partially in section, a piston 1 having a longitudinal recess 2 extending into the piston from the base 3. A connecting rod 4 has one end 5 thereof disposed in the recess 2 and is connected to the piston 1 by means of a wrist pin 6 which extends through a transverse passage 7 in the piston and an opening 9 in the end 5 of the connecting rod. The coaxial transverse passage 7 and opening 9 form bearing surfaces for the wrist or piston pin 6 and in cooperation therewith provide limited relative movement between the piston 1 and the connecting rod 4.

Shims 11 and 13 provided on opposite sides of the connecting rod 4 and between the opposite sides of the rod and walls 12 defining opposed sides of the recess 2 function as thrust bearings to limit the wear on the adjacent piston and connecting rod surfaces during operation of a compressor including the subject assembly.

In accordance with the present invention at least one of the shims is also employed to maintain the wrist pin 6 within the passage 7 to prevent any axial movement of the wrist pin which would cause it to come in contact with and score the side walls 14 of the compressor cylinder during reciprocal movement of the piston 1 within the cylinder. In the illustrated embodiment of the invention shim 13 is so employed and there is provided in the wrist pin 6 on one side of the connecting rod 4, an annular or circumferentially extending slot 15 which is adapted to receive the inner edge 16 of the shim 13. With the inner edge 16 of the shim 13 disposed within the slot 15 and its outer edge portions 17 disposed between the connecting rod end 5 and one of the walls 12 of the piston recess, the pin 6 is securely anchored or retained within the passage 7 so that neither end of the wrist pin 6 can come in contact with the cylinder side walls 14.

Figure 3:
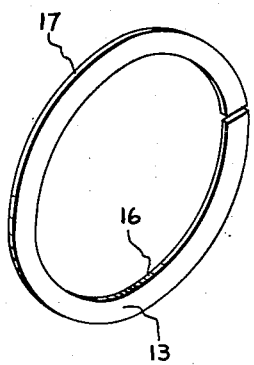
Fig. 3 illustrates one form of shim which can be employed for anchoring the wrist pin within the piston and connecting rod assembly.
Figure 2:
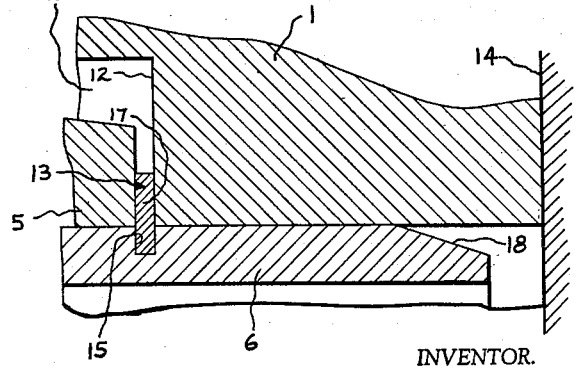
Fig. 2 is an enlarged sectional view of a portion of the assembly shown in Fig. 1.

Preferably, the shim 13 is in the form of a split ring as shown in Fig. 3 and is composed of spring steel or the like so that during the assembly of the piston and connecting rod or more specifically during the insertion of the wrist pin 6 into the passage 7, the split shim 13 can expand and pass over the tapered end portion 18 of the wrist pin 6.

In the manufacture of this assembly, there is employed a wrist pin 6 having a length such that when it is disposed in the passage 7, its opposite ends will be recessed within the passage out of contact with the cylinder wall 14. After inserting the end 5 of the connecting rod into the recess 2 and placing the shim 11 and the split anchoring shim 13 in their operating positions between the side walls of the connecting rod 4 and the walls 12 of the recess 2, the wrist pin 6 is inserted from left to right with reference to Fig. 1 so that the tapered end 18 of the wrist pin threads through the regular shim 11 and the opening 9 in the end of the connecting rod 4 and into the split ring 13. In order that the wrist pin can be forced through the split ring 13 a tapered end 18 may be used to cause the split ring 13 to expand and ride the outer circumference of the wrist pin until its inner edge 16 springs into the groove 15 to anchor the wrist pin within the assembly. Alternatively, a tapered plug inserted in one end of the pin 6 can be used in place of the tapered end 18 to expand the split ring 13 during the assembly operation.

While the invention has been particularly described in connection with a specific embodiment of the invention it will be apparent to those skilled in the art that various changes and modifications may be made therein without departing from the invention and it is therefore intended by the appended claims to cover the spirit and scope of the invention.

What I claim as new and desire to secure by Letters Patent of the United States is:

1. A piston and connecting rod assembly for compressors and the like comprising a piston having walls defining a longitudinal recess therein, and a transverse passage intersecting said recess and forming a wrist pin bearing, a connecting rod having one end extending into said recess, an opening in said one end, a wrist pin extending through said opening and engaging said wrist pin bearing, and means for retaining said wrist pin comprising an annular slot in said wrist pin and a split ring disposed in said slot and between said walls of said recess and said one end of said connecting rod.

2. A piston and connecting rod assembly for compressors and the like comprising a piston having walls defining a longitudinal recess therein, and a transverse passage intersecting said recess and forming a wrist pin bearing, a connecting rod having one end extending into said recess, an opening in said one end, a wrist pin extending through said opening and engaging said wrist pin bearing, shims on said pin between said rod and said walls of said recess, an annular slot in said wrist pin in line with one of said shims, said one of said shims having an inner edge portion disposed in said slot for anchoring said pin in said passage.

References Cited in the file of this patent

UNITED STATES PATENTS

| | | |
|---|---|---|
| 1,952,202 | Flammang et al. | Mar. 27, 1934 |
| 2,747,953 | Laubender | May 29, 1956 |